(12) United States Patent  (10) Patent No.: US 7,555,519 B2
Darby  (45) Date of Patent: Jun. 30, 2009

(54) ENCODED ELECTRONIC MAIL

(75) Inventor: Daylan B Darby, West Jordan, UT (US)

(73) Assignee: Intel Corporation, Santa Clara, CA (US)

( * ) Notice: Subject to any disclaimer, the term of this patent is extended or adjusted under 35 U.S.C. 154(b) by 710 days.

(21) Appl. No.: 09/880,488

(22) Filed: Jun. 13, 2001

(65) Prior Publication Data

US 2003/0001889 A1  Jan. 2, 2003

(51) Int. Cl.
*G06F 15/16*  (2006.01)

(52) U.S. Cl. .................. 709/206; 709/200; 709/205; 709/218; 709/224; 707/1; 707/205

(58) Field of Classification Search .................. 709/206, 709/224, 200, 205, 218; 707/1, 205
See application file for complete search history.

(56) References Cited

U.S. PATENT DOCUMENTS

| 5,903,723 | A  | * | 5/1999  | Beck et al. ............. 709/200 |
| 6,058,389 | A  | * | 5/2000  | Chandra et al. ............ 707/1 |
| 6,065,048 | A  | * | 5/2000  | Higley ................. 709/218 |
| 6,230,189 | B1 | * | 5/2001  | Sato et al. ............. 709/206 |
| 6,457,044 | B1 | * | 9/2002  | IwaZaki ............... 709/206 |
| 6,578,078 | B1 | * | 6/2003  | Smith et al. ............ 709/224 |
| 6,640,242 | B1 | * | 10/2003 | O'Neal et al. .......... 709/206 |
| 6,651,087 | B1 | * | 11/2003 | Dennis ................ 709/206 |
| 6,687,742 | B1 | * | 2/2004  | Iwazaki ............... 709/206 |
| 6,915,333 | B2 | * | 7/2005  | Delia et al. ............ 709/206 |
| 7,055,091 | B1 | * | 5/2006  | Williams .............. 715/500 |

* cited by examiner

*Primary Examiner*—Jinsong Hu
(74) *Attorney, Agent, or Firm*—Sharmini N. Green

(57) ABSTRACT

An algorithm for encoded electronic mail is disclosed whereby the meta-data of the email and the files that represent the email data are combined into a single file. Encoding, via a header, is then used to monitor the changes to the meta-data and the location of the actual data within the file. The format of the combined file may be, but is not limited to, a fixed-sized header that contains links to the information within the file, followed by the actual email data, followed by the variable meta-data information. The header links include a link to the start of the email data, a link to the email sender, and a link to the email receivers. All the meta-data information is referenced, but not necessarily stored, in the header. The system is designed to maximize the use of resources including, but not limited to, memory, disk space, file descriptors, and locks.

15 Claims, 4 Drawing Sheets

ENCODED ELECTRONIC MAIL

BACKGROUND

1. Field of the Invention

Embodiments described herein are directed to encoded electronic mail that includes the files that represent the meta-data of an email, the files that represent the email data, and the processes that act on these files. The meta-data is combined with the email data within a single file, and encoding, by means of a header, is implemented to monitor the changes to the meta-data and the location of the email data within the file.

2. Related Art

Current electronic mail systems utilize the files that represent the meta-data of electronic mail as well as the files that represent the electronic mail data. An email process receives the email data into a data-file and creates one or more meta-files to describe the email. Other email functions consult and/or modify the meta-files to process (e.g., parse, route, or forward) the email. This method is prone to email corruption. That is, if any of the meta-files are deleted inadvertently, the corresponding data-file becomes unusable. The converse is also true. Several causes of accidental deletion include a system crash, failed backup/restore, and administrative error.

In a typical operating system, email files are treated in a like manner as other files. The operating system does not have an inherent understanding of the relationship between files. For instance, in a conventional email system, a certain set of the email meta-files is considered the root or main files. These files contain references such as filename and file extensions to other meta-files and data-files. If a root is accidentally deleted, the other meta-files and data-files associated with it are orphaned such that they consume disk space without being referenced. If a non-root file is deleted, then the set of meta-files and data-files that represent that particular email message are incomplete.

Moreover, in a representative email system, the set of meta-files and data-files that represent a particular email message are all opened at once, thereby consuming operating system-limited file descriptors and file buffers. These opened files cause the operating system to allocate memory from the system load, thus reducing the amount of memory and file descriptors available to other non-email processes. To alleviate the problem, there is a need to minimize open file descriptors and therefore maximize system resources for non-email processes.

Encoded electronic mail is thus designed to minimize the use of the central processing unit by maximizing the use of system resources such as memory, disk space, file descriptors, locks, and the like. That is, the meta-data is combined with the actual email data within a single file, and encoding, via the addition of a header, is used to monitor the changes to the meta-data and the location of the actual email data within the file.

BRIEF DESCRIPTION OF THE DRAWINGS

In order that all of the structural and functional features for attaining the objects for Encoded Electronic Mail may be readily understood, a detailed description of embodiments of the invention will be made with reference to the accompanying drawings, wherein like numerals designate corresponding parts in the several figures.

DETAILED DESCRIPTION

Figure 1:
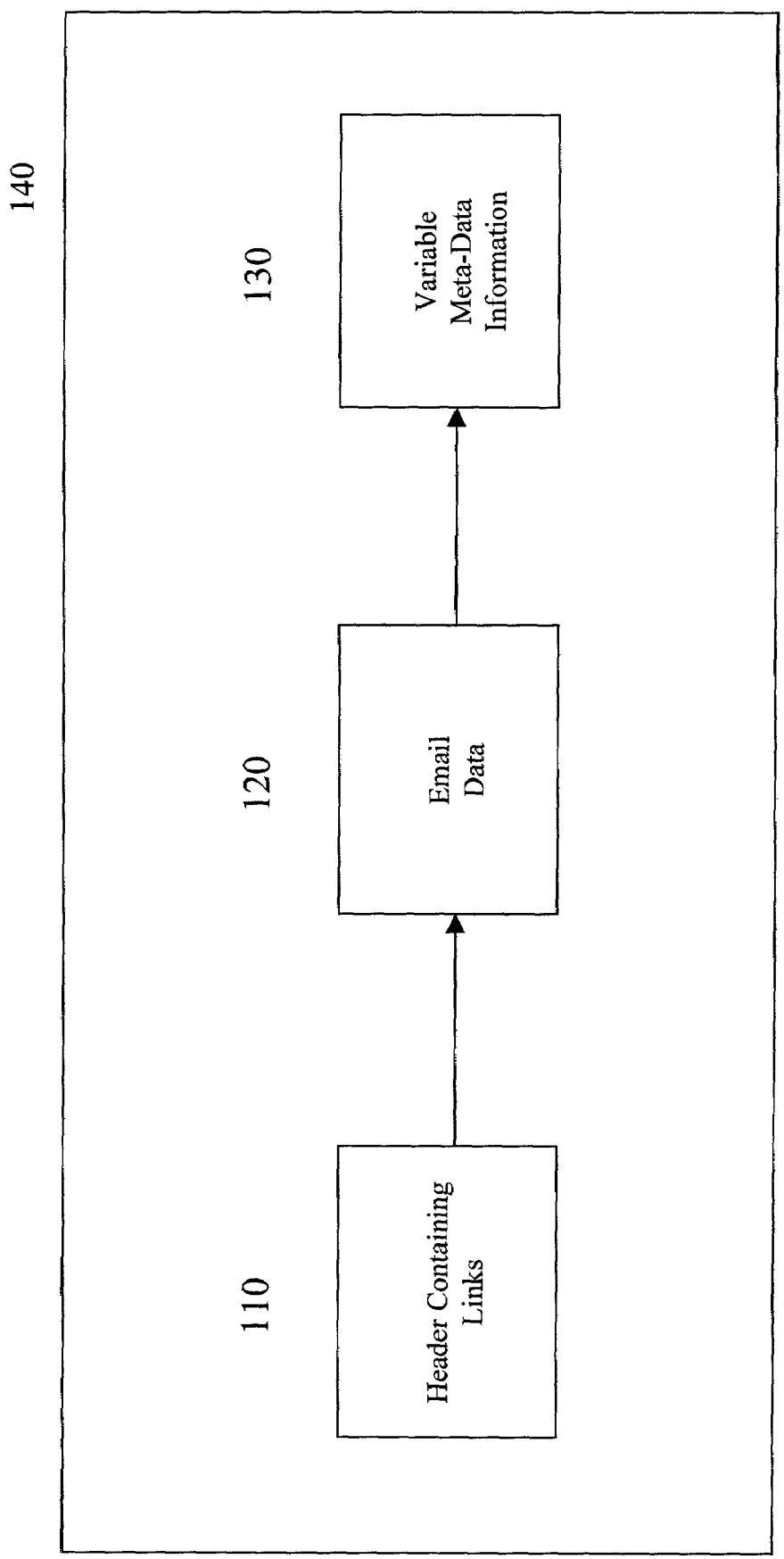
FIG. 1 is a block diagram illustrating the components of encoded electronic mail.

The following paragraphs describe encoded electronic mail according to an embodiment of the present invention. The components include the files that represent the meta-data of the electronic mail, the files that represent the electronic mail data, and the processes that act on these files. Meta-data files contain information such as, but not limited to, email sender, email receiver(s), email file size, email forwarding, and processing information.

In a typical system, when an email message is sent from one computer to another computer, the sending computer establishes a Simple Mail Transfer Protocol ("SMTP"), i.e., RFC821 session with the receiving computer. The receiving computer may be the ultimate destination or an intermediate destination. SMTP commands are generated by the sender SMTP and sent to the receiver SMTP. SMTP replies are sent from the receiver SMTP to the sender SMTP in response to the commands. The sending computer sends a "HELO . . . " and the receiving computer responds with an "OK . . . " The HELO command is used to identify the sender SMTP to the receiver SMTP wherein the argument field contains the host name of the sender SMTP. The receiver SMTP identifies itself to the sender SMTP in the greeting reply and in the response to the HELO command. This command and the OK reply to it confirm that the sender SMTP and the receiver SMTP are in the initial state. That is, there is no transaction in progress.

The sending computer then sends a "MAIL FROM . . . " The MAIL command is used to initiate a mail transaction in which the mail data is delivered to one or more mailboxes. Provided that the receiving computer can accept the mail, it responds with an "OK . . . " The sending computer sends one or more "RCPT TO . . . " indicating a recipient of the mail data; multiple recipients are specified by multiple use of the RCPT TO command. If the receiving computer can accept mail for those recipients, it responds to each with an "OK . . . " If not, it responds with a reply rejecting that recipient but not the entire mail transaction. The RCPT TO information is a variable part of the meta-data. An example of a RCPT TO is jane.doe@schwa.com. The RCPT TO may also be an alias, a group list, a forwarding account, or the like. In a conventional system, the date, MAIL FROM, and RCPT TOs are included in the meta-file. The receiving computer builds the meta-file during the conversation with the sending computer.

After all the RCPT TOs are sent, the sending computer sends "DATA" and the receiving computer responds with "OK". The sending computer then sends the RFC822 header and body, which both appear as DATA to the RFC821 session, and the receiving computer responds with "OK . . . " and the sending computer either sends the next email message or closes the SMTP.

In sum, there are three steps to SMTP mail transactions. The transaction commences with a MAIL command that gives the sender identification. A series of one or more RCPT commands follows giving the receiver information. Then, a DATA command gives the mail data. Finally, the end of a mail data indicator confirms the transaction.

The receiving computer then has a meta-file that contains the RFC821 instructions and at least a data file that contains the RFC822 header and body. Some mail systems split the data file into two files, whereby one contains the RFC822 header and the other contains the RFC822 body. The RFC822 header essentially is a human readable email routing instruction that is followed by a blank line and then the RFC822 body. Email attachments are always encoded in the RFC822 body.

The receiving computer then has to determine to whom to forward the email message. In a simple case, the meta-file, containing the RFC821 instructions, contains a single forwarding address, i.e., jane.doe@schwa.com, and the RFC822 header and body are either appended to the local mailbox or forwarded onto the next computer. In a non-trivial case, the meta-file contains an alias, a group list, a forwarding account, etc. For instance, if a message is addressed to all@schwa.com instead of jane.doe@schwa.com, the receiving computers would replace the single "RCPT TO: all@schwa.com" with multiple names. Because it is an inefficient operation to insert names in a file, the email software would not alter the RFC822 header file for each insert. Rather, the email software would rewrite the rather short meta-file that contains the RFC821 instructions. The receiving computer would then either append the RFC822 header and body files to each local mailbox or become a sending computer and forward the email message to the next computer.

From the point of reception of an email message to the point of either relaying the message to another computer or storing the message in a local mailbox, the email software typically treats the RFC822 header and the RFC822 data as read-only. Inserting and deleting routing information in the RFC822 header on a continuous basis is an inefficient practice. As such, the insertion, deletion, and other manipulation functions are only performed in the meta-file. Only when the email message is ready to be stored locally or sent to another computer is the RFC822 header rewritten with the new information.

In one embodiment of the present invention, as illustrated in FIG. 1, variable meta-data information 130 is combined with actual email data 120 within a single file 140. A header is then used to monitor any changes to the meta-data 130 and the location of the actual email data 120 within the file. A format of the combined meta-file/data-file 140 could be, but is not limited to, a fixed sized header 110, that contains links or indices to the information within the file 140. This includes a link to the header size. The header 110 may be expressed in any common syntax including, but not limited to, XML, HTML, and numeric offsets. The header 110 links include a link to the start of the email data, a link to the email sender, a link to the email receiver(s), and the like. All the meta-data information 130 is similarly referenced, but not necessarily stored, in the header 110.

Following the header 110 is the actual email data 120. The data portion is of variable length. Once recorded, the data portion does not change in size. Following the header 110 and the actual email data 120 is the variable meta-data information 130. Because email recipients are often aliased and forwarded and mailing lists are expanded, this information changes as the email is processed within the email system. Rather than rewriting the meta-files, this section is rewritten or re-appended and the header links rewritten.

A possible format for the single file 140 that describes the internally stored email message is found in Table 1.

TABLE 1

| | |
|---|---|
| Received Time | 32 bit number of seconds since Epoch that this message was received |
| HELO Index | 32 bit number of bytes from start of file where HELO information is stored |

TABLE 1-continued

| | |
|---|---|
| MAIL FROM Index | 32 bit number of bytes from start of file where MAIL FROM information is stored |
| RCPT TO Index | 32 bit number of bytes from start of file where RCPT TO information is stored |
| RCPT TO Count | 32 bit number of RCPT TO strings |
| RFC822 Header Index | 32 bit number of bytes from start of file where RFC822 header information is stored |
| RFC822 Body Index | 32 bit number of bytes from start of file where RFC822 body information is stored |
| RFC822 Header | A NULL terminated character string containing the received RFC822 header |
| RFC822 Body | A NULL terminated character string containing the received RFC822 body |
| HELO Information | A NULL terminated character string containing the name of the sending computer |
| MAIL FROM Information | A NULL terminated character string containing the name of the sending user |
| RCPT TO Information | A set of NULL terminated character strings containing the name(s) of the recipient(s) |

Figure 2:
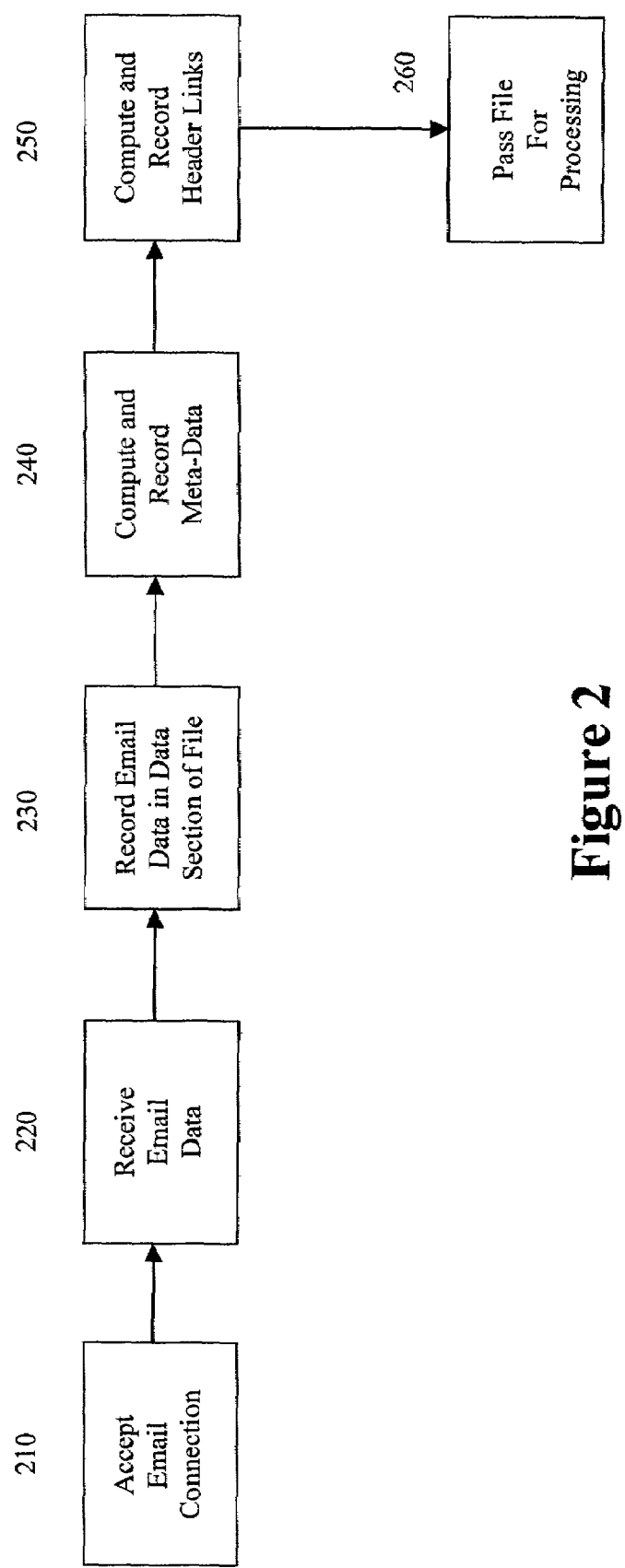
FIG. 2 is a flow chart illustrating the steps associated with receipt of an electronic mail.

Because the RCPT TO information is variable, it is last in the chain such that an append/overwrite file operation can be used to modify the RCPT TO list. The same type of email processing described above would then be performed using this format. That is, as shown in FIG. 2, an SMTP email connection is accepted. This is illustrated in step 210. As shown in step 220, email data 120 is then received. This email data 120 is then recorded in the data section of the single file 140. This is shown in step 230. As illustrated in step 240, the variable meta-data information 130 is then computed and recorded. Next, header 110 links are computed and recorded. This is demonstrated in step 250. Finally, as shown in step 260, the email file 140 is passed on for processing.

Figure 3:
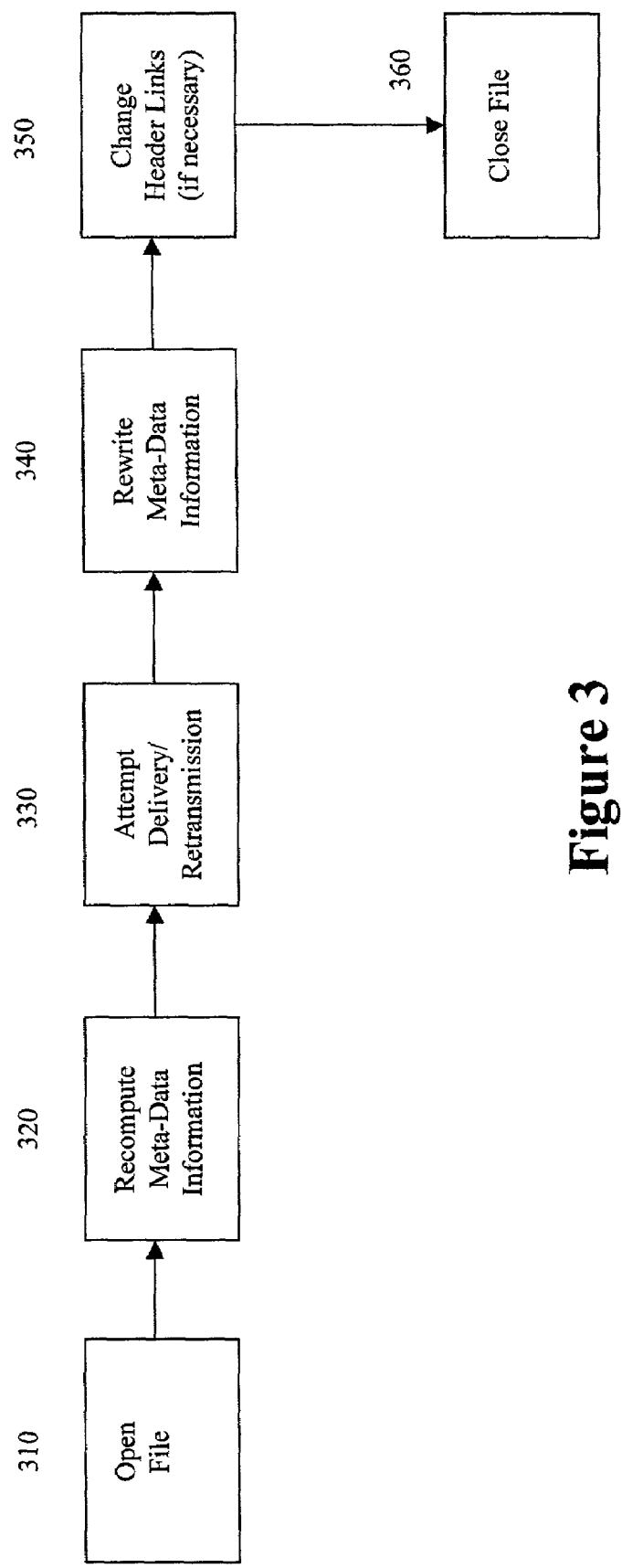
FIG. 3 is a flow chart illustrating the steps associated with an electronic mail process.

As shown in FIG. 3, regarding email processing, the combined single file 140 would be opened, as illustrated by step 310. Based on aliases, forwarding rules, group lists, etc., the variable meta-data information 130 is then recomputed, as shown by step 320. Delivery, or possibly retransmission, of the message is then attempted. This is illustrated in step 330. Next, as shown in step 340, the variable meta-data information 130 is rewritten. Based on any adjustments, header 110 links are then changed in order to monitor the modified information. This is illustrated in step 350. Finally, the single file 140 is closed, as illustrated in step 360.

Figure 4:
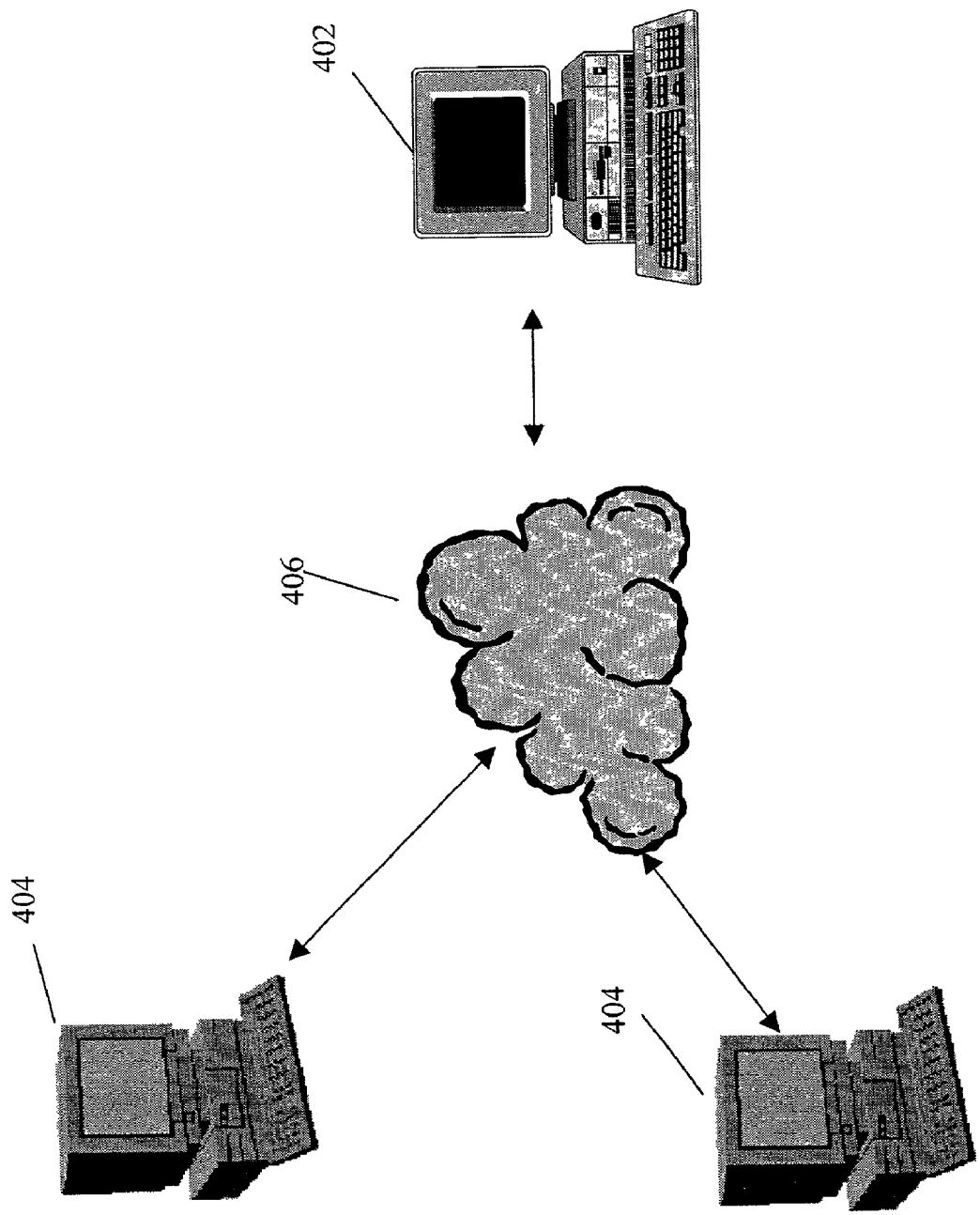
FIG. 4 is a depiction of an email system in a data communications network.

FIG. 4 depicts the overall electronic mail system in operation. That is, as previously described, a sending computer 402 establishes an SMTP connection with one or more receiving computers 404. Transmission of the electronic mail message occurs over a data communication network 406 to which the sending computer 402 and the one or more receiving computers 404 are linked. The data communication network 406 may include the Internet, an Intranet, or any combination of public and private data communication networks.

While the above description refers to particular embodiments of the present invention, it will be understood to those of ordinary skill in the art that modifications may be made without departing from the spirit thereof. The accompanying claims are intended to cover any such modifications as would fall within the true scope and spirit of the present invention.

The presently disclosed embodiments are therefore to be considered in all respects as illustrative and not restrictive; the scope of the invention being indicated by the appended claims, rather than the foregoing description. All changes that come within the meaning and range of equivalency of the claims are therefore intended to be embraced therein.

What is claimed is:

1. A method performed by a processor for providing a single electronic mail file containing electronic mail data and variable meta data, the method comprising:
combining into a single electronic mail file the electronic mail data and the variable meta-data information, wherein the variable meta-data describes the electronic mail data;
monitoring changes to the variable meta-data information with a header wherein the header operates as an encoder and monitors changes to the variable meta-data information, the header additionally monitoring location information identifying the position of the electronic mail data within the electronic mail file;
recompute the variable meta-data information;
attempt delivery of the electronic mail file;
rewrite the variable meta-data information;
change location information contained within the header; and
send the electronic mail file to a receiving computer.

2. The method of claim 1, wherein the electronic mail data is of variable length when unrecorded and is of fixed length when recorded.

3. The method of claim 1, wherein the variable meta-data information is referenced in the header.

4. A computer readable storage medium having computer readable instructions encoded therein to:
accept an electronic mail connection;
receive a single electronic mail file comprising electronic mail data combined with meta-data information describing the electronic mail data, the single electronic mail file further comprising a header which operates as an encoder and monitors changes to the variable meta-data information, the header additionally monitoring location information identifying the position of the electronic mail data within the electronic mail file;
record the electronic mail data;
compute and record the variable meta-data information;
compute and record the location information contained within the header; and
send the electronic mail file containing the electronic mail data and the variable meta-data information to a receiving computer.

5. The computer readable storage medium of claim 4, wherein the electronic mail data is of variable length when unrecorded and is of fixed length when recorded.

6. The computer readable storage medium of claim 4, wherein the variable meta-data information is referenced in the header.

7. The computer readable storage medium of claim 4, wherein the header links include links to a start of the electronic mail data, to an electronic mail sender, and to an electronic mail recipient.

8. A computer readable storage medium having computer readable instructions encoded therein to:
open a single electronic mail file containing combined electronic mail data and meta-data information describing the electronic mail data, the single electronic mail file further comprising a header which operates as an encoder and monitors changes to the variable meta-data information, the header additionally monitoring location information identifying the position of the electronic mail data within the electronic mail file;
recompute the variable meta-data information;
attempt delivery of the electronic mail file;
rewrite the variable meta-data information;
change the location information contained within the header; and
close the electronic mail file.

9. The computer readable storage medium of claim 8, wherein the electronic mail data is of variable length when unrecorded and is of fixed length once recorded.

10. The computer readable storage medium of claim 8, wherein the variable meta-data information is referenced in the header.

11. The computer readable storage medium of claim 8, wherein the header includes links to a start of the electronic mail data, to an electronic mail sender, and to an electronic mail recipient.

12. A method performed by a processor for providing a single electronic mail file from a sending computer to at least one receiving computer within a data communication network, the method comprising:
establishing a simple mail transfer protocol (SMTP) session between the sending computer and the at least one receiving computer by;
generating SMTP commands by the sending computer;
sending the SMTP commands to the at least one receiving computer; and
receiving SMTP replies from the at least one receiving computer on the sending computer;
sending the single electronic mail file from the sending computer to the receiving computer, wherein the single electronic mail file includes combined electronic mail data and variable meta-data information describing the electronic mail data, and a header which operates as an encoder and monitors changes to the variable meta-data information, the header additionally monitoring location information identifying the position of the electronic mail data within the electronic mail file.

13. The method of claim 12, wherein the data communication network includes an Internet or Intranet.

14. The method of claim 12, wherein the header includes a link to a start of the electronic mail data, to an electronic mail sender, and to an electronic mail recipient.

15. The method of claim 12, wherein the meta-data information is referenced in the header.

* * * * *